J. E. Hawkins,
Bread Machine.
No. 101,615.      Patented Apr. 5, 1870.
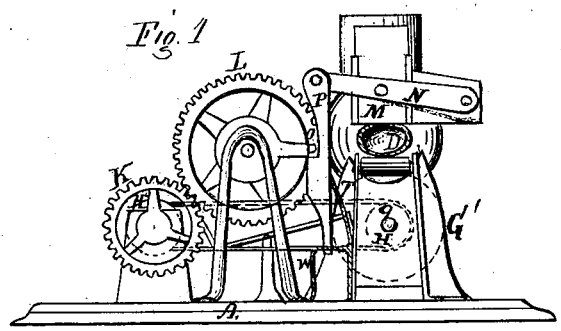
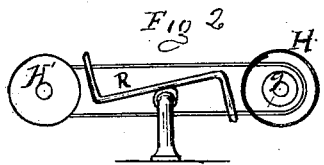
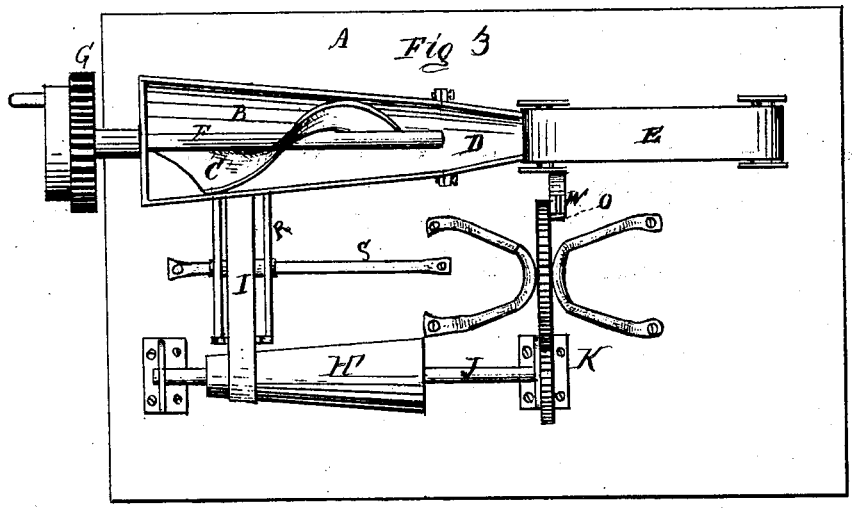
Witnesses.   Chas L Coombs.     Inventor,
      W. L. Coombs.        John E. Hawkins
                      by Chas L Coombs
                         atty

United States Patent Office.

JOHN E. HAWKINS, OF LANSINGBURG, NEW YORK.

Letters Patent No. 101,615, dated April 5, 1870.

IMPROVED BREAD-MACHINE.

The Schedule referred to in these Letters Patent and making part of the same.

*To all whom it may concern:*

Be it known that I, JOHN E. HAWKINS, of Lansingburg, in the county of Rensselaer and State of New York, have invented a new and useful Improvement in Bread-Machines; and I do hereby declare that the following is a full, clear, and exact description thereof.

The nature of my invention relates to an improvement upon the machine for which Letters Patent No. 96,804, were granted to me on the 16th day of November, 1869; and It consists in mechanism whereby the roll of dough is automatically cut into loaves as it passes from the former onto the endless apron, and also in so securing the former to the mixer that it may be readily attached and detached to said mixer, in order that others may be substituted having openings of various shapes and sizes, in order to adapt the machine to the manufacture of bread-loves, cakes, and crackers of various sizes and shapes, as may be desired.

In the drawing—

Figure 1 represents a front view of my improved apparatus; and

Figure 2, a view of the adjustable gearing by means of which the speed of the wheels which actuate the knife is regulated; and Figure 3, a top view of my apparatus.

A represents a platform upon which the machine is fastened, and

B represents the mixer.

C is a screw-blade within the mixer for forcing the dough through the former D.

E is an endless belt upon which the dough falls as it issues from the former.

F is a shaft carrying the screw-blade C; and

G, a gear-wheel by which said shaft is put in motion.

The wheel G gears into a similar wheel, G', upon the shaft $g$, fig. 1, which passes under the mixer B and carries a cone-pulley, H, figs. 1 and 2.

Said cone-pulley imparts motion, by means of a belt, I, to a cone-pulley, H', which is set upon a shaft, J, carrying, at one end, a wheel, K, which gears into and imparts motion to a wheel, L.

M represents a reciprocating knife, sliding in grooves or ways secured just above the mouth of the former D.

Motion is imparted to the knife M by means of a lever, N, which is depressed, at proper intervals, by means of a pin, O, upon the wheel L, which engages the hook P, attached to one end of said lever.

The lower end of said hook works in a guide, W, in such a manner as to be released from the pin O when the lever N is fully depressed, and be returned to its proper position by a spring, T, when the lever is raised.

The lever N is raised, when the hook P becomes disengaged from the pin O, by means of a spring, Q, and carries the knife K with it.

The speed at which the wheels K and L, which actuate the knife, revolve, may be varied at pleasure in relation to the speed of the shaft F, by shifting the belt I along the cone-pulleys H and H', and by this means the length of the loaf cut from the roll may be varied.

To facilitate the shifting of the belt, a shifter, R, is provided, which embraces the upper and lower sides of the belt, as shown in figs. 2 and 3, and slides upon a rod, S, fastened to the platform A between the cone-pulleys.

The former D is so constructed that it may be readily attached or detached from the mixer B, and others having openings of various sizes and shapes substituted, in order to adapt the machine to the manufacture of loaves, crackers, or cakes of various sizes and shapes. I have shown said former attached to the mixer by means of a flange and screw-bolts, and the drawings represent a former for making loaves of an oval shape, but any other convenient manner may be employed for securing the former, and as many formers of various sizes and shapes employed as may be found necessary.

What I claim is—

1. A former, D, so constructed that it may be readily attached or detached from the mixer and others substituted, in order to adapt the machine to the manufacture of loaves, crackers, or cakes of various sizes and shapes, as herein described.

2. In combination with the detachable former, the knife, operated in the manner shown and herein described.

3. In combination with the mixer B and adjustable former D, a knife, M, so arranged in relation to the revolving screw-blade C that it may be adjusted to cut from the roll loaves of various lengths, as herein described.

JOHN E. HAWKINS.

Witnesses:
CHAS. L. COOMBS,
JOS. C. COOMBS.